J. K. ALSTON.
LAG FOR CONVEYER CHAINS.
APPLICATION FILED MAR. 1, 1910.
988,239.
Patented Mar. 28, 1911.
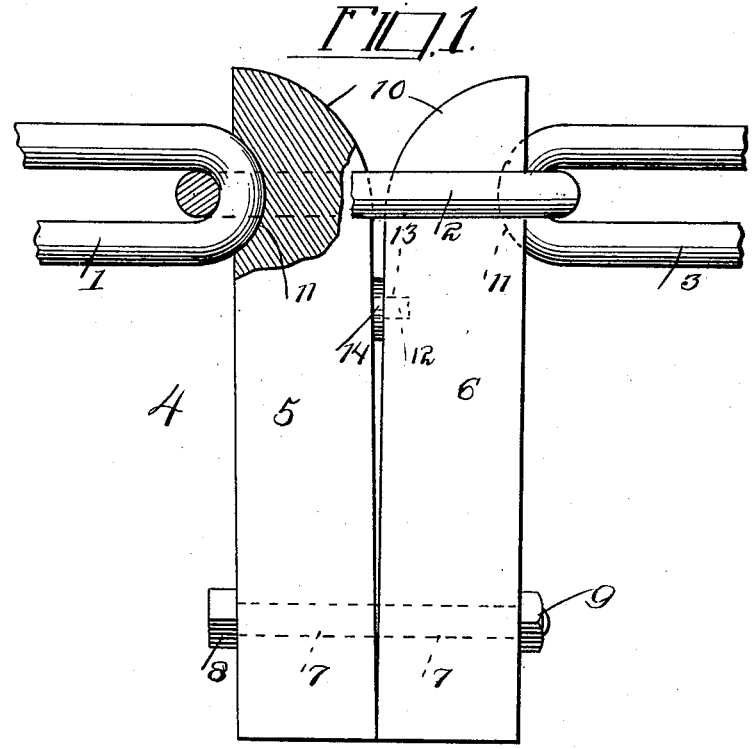
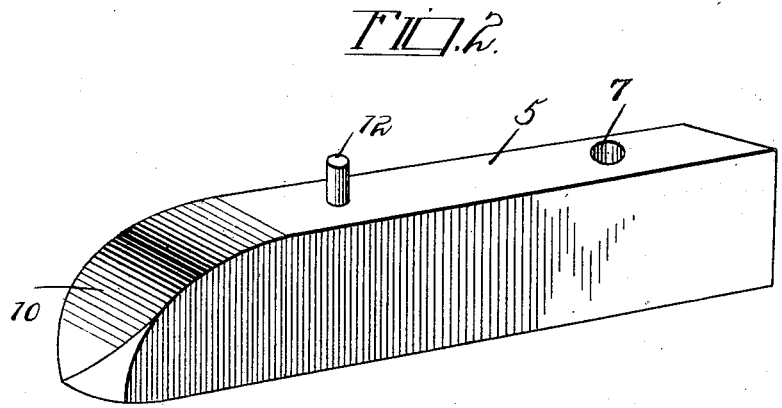
Witnesses
Wm. Smith.
C. C. Hines.
Inventor
James K. Alston.
By Victor J. Evans
Attorney

UNITED STATES PATENT OFFICE.

JAMES K. ALSTON, OF MILLVILLE, FLORIDA.

LAG FOR CONVEYER-CHAINS.

988,239.  Specification of Letters Patent.  Patented Mar. 28, 1911.

Application filed March 1, 1910. Serial No. 546,672.

*To all whom it may concern:*

Be it known that I, JAMES K. ALSTON, a citizen of the United States, residing at Millville, in the county of Washington and State of Florida, have invented new and useful Improvements in Lags for Conveyer-Chains, of which the following is a specification.

This invention relates to improvements in lags for link conveyer chains, the object of the invention being to provide a simple, strong, durable and efficient construction of lag which can be easily applied to the chain and as easily removed for repairs or substitution in case of injury.

The invention consists of the features of construction, combination and arrangement of parts hereinafter fully described and claimed, reference being had to the accompanying drawing, in which:—

Figure 1 is a plan view, partially in section, showing the application of the invention. Fig. 2 is a perspective view of one of the lag sections.

Referring to the drawings, 1, 2 and 3 represent links of a conveyer chain and 4 the lag, the latter comprising a pair of oblong rectangular bars 5 and 6 of cast iron or steel, wrought iron or malleable iron or steel. The bars are coextensive in length and each is provided at one end with a transverse opening 7. A bolt 8 passes through and connects said ends of the bars and is provided with a retaining nut 9. The opposite ends of the bars extend through the intermediate link 2 and have beveled or rounded inner faces 10 and outer recesses 11 to receive the adjacent ends of the links 1 and 3. At a distance inwardly from its beveled face 10 the inner surface of one of the bars is provided with a dowel pin 12 to enter a dowel seat 13 in the other bar, said pin being adapted to lock the bars against relative movement and support a washer 14, which holds the recessed ends of the bars spread in divergent relation to effectually interlock with the links 1 and 3.

In applying the lag, the nut 9 is loosened or removed, the links 1 and 3 turned outward at an angle, and the recessed ends of the bars then inserted through the link 2 and engaged with the ends of the links 1 and 3. Upon then turning said links 1 and 3 back into alinement with the link 2 the parts will be disposed as in Fig. 1. The nut 9 is then tightened to its full extent, under which the bars swing to some extent on the dowel 12 as a pivot, thus spreading their recessed ends firmly into locking engagement with the links 1 and 3. If the lag should be broken or otherwise injured, it may be removed by disengaging the bolt and turning the links 1 and 3 to force the bars outwardly from between them, as will be readily understood.

I claim:—

1. In a conveyer chain, the combination of a pair of end links and a connecting central link, a lag comprising bars projecting at one end through the central link and formed in their outer faces with recesses receiving the adjacent ends of the outer links, the inner faces of said ends of the bars being beveled, one of said bars being provided in its inner face with a dowel seat, and the other with a dowel pin to engage said seat, a washer engaging said pin and operating to spread the beveled ends of the bars to hold the same in engagement with said outer links, and a bolt passing through and uniting the opposite ends of the bars.

2. In a conveyer chain, and in combination with a pair of end links and a central link connecting the same, a lag comprising bars projecting at one end longitudinally through the central link, the outer faces of the projecting ends of the bars being formed with recesses receiving the adjacent ends of the outer links and the inner faces of said ends of the bars being beveled, and an interlocking connection between the inner faces of the bars operating to hold the beveled ends of the bars spread to maintain a secure engagement between said recessed faces and outer links.

In testimony whereof I affix my signature in presence of two witnesses.

JAMES K. ALSTON.

Witnesses:
W. H. MARSHALL,
W. W. WASHBURN.

Copies of this patent may be obtained for five cents each, by addressing the "Commissioner of Patents, Washington, D. C."